United States Patent
Kang et al.

(10) Patent No.: US 9,690,456 B2
(45) Date of Patent: Jun. 27, 2017

(54) METHOD FOR CONTROLLING WINDOW AND ELECTRONIC DEVICE FOR SUPPORTING THE SAME

(71) Applicant: Samsung Electronics Co., Ltd., Suwon-si, Gyeonggi-do (KR)

(72) Inventors: Doosuk Kang, Suwon-si (KR); Bokun Choi, Seoul (KR); Hanjib Kim, Suwon-si (KR); Minkyung Hwang, Seoul (KR); Yongjoon Jeon, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 323 days.

(21) Appl. No.: 14/486,280

(22) Filed: Sep. 15, 2014

(65) Prior Publication Data

US 2015/0089442 A1    Mar. 26, 2015

(30) Foreign Application Priority Data

Sep. 25, 2013    (KR) .................. 10-2013-0113600

(51) Int. Cl.
  *G06F 3/0484*    (2013.01)
  *G06F 3/0481*    (2013.01)
  *G06F 3/0488*    (2013.01)

(52) U.S. Cl.
  CPC .......... *G06F 3/0484* (2013.01); *G06F 3/0481* (2013.01); *G06F 3/0488* (2013.01); *G06F 2203/04806* (2013.01)

(58) Field of Classification Search
  CPC ..................................................... G06F 3/0484
  USPC ........................................................ 715/788
  See application file for complete search history.

(56) References Cited

U.S. PATENT DOCUMENTS

| 6,577,249 B1* | 6/2003 | Akatsuka ............ G06K 9/3216 |
| | | 340/988 |
| 8,266,544 B1* | 9/2012 | Kay ..................... G06F 21/53 |
| | | 715/760 |
| 2004/0125149 A1* | 7/2004 | Lapidous .............. G06F 3/0481 |
| | | 715/808 |
| 2005/0096983 A1* | 5/2005 | Werkhoven ........ G06Q 30/0277 |
| | | 705/14.73 |
| 2005/0249435 A1* | 11/2005 | Rai ........................ G06T 3/60 |
| | | 382/296 |
| 2006/0288305 A1* | 12/2006 | Liu ...................... G06F 3/0481 |
| | | 715/800 |
| 2007/0192734 A1* | 8/2007 | Berstis ................. G06F 3/0481 |
| | | 715/808 |
| 2011/0218825 A1* | 9/2011 | Hertenstein ............ G06Q 40/08 |
| | | 705/4 |

(Continued)

FOREIGN PATENT DOCUMENTS

| KR | 1020050017503 A | 2/2005 |
| KR | 1020110074426 A | 6/2011 |

*Primary Examiner* — Reza Nabi
(74) *Attorney, Agent, or Firm* — Jefferson IP Law, LLP

(57) ABSTRACT

A method for controlling a window displayed in a screen area of an electronic device is provided. The method includes executing the window, configuring a reference point of the window according to a predetermined reference, receiving a request for changing a property of the window, in response to receiving the request for changing the property of the window, changing the property of the window on the basis of the reference point, and reconfiguring the reference point of the property-changed window.

20 Claims, 15 Drawing Sheets

(56) References Cited

U.S. PATENT DOCUMENTS

| | | | |
|---|---|---|---|
| 2012/0050824 A1* | 3/2012 | Kim | H04N 1/00684 358/474 |
| 2013/0064430 A1* | 3/2013 | Nakano | G06T 3/00 382/103 |
| 2014/0010461 A1* | 1/2014 | Sugai | G06T 11/60 382/206 |
| 2014/0050381 A1* | 2/2014 | Lee | A61B 8/5223 382/131 |
| 2014/0078102 A1* | 3/2014 | Araki | G06F 3/016 345/174 |
| 2014/0098296 A1* | 4/2014 | Arora | G06T 15/20 348/580 |
| 2014/0313364 A1* | 10/2014 | Fan | H04N 5/225 348/222.1 |
| 2014/0351724 A1* | 11/2014 | Kim | G06F 3/04883 715/765 |
| 2015/0033125 A1* | 1/2015 | Kang | G06F 3/0488 715/719 |
| 2015/0033329 A1* | 1/2015 | Griffin | G09C 5/00 726/19 |
| 2015/0089442 A1* | 3/2015 | Kang | G06F 3/0488 715/788 |

* cited by examiner

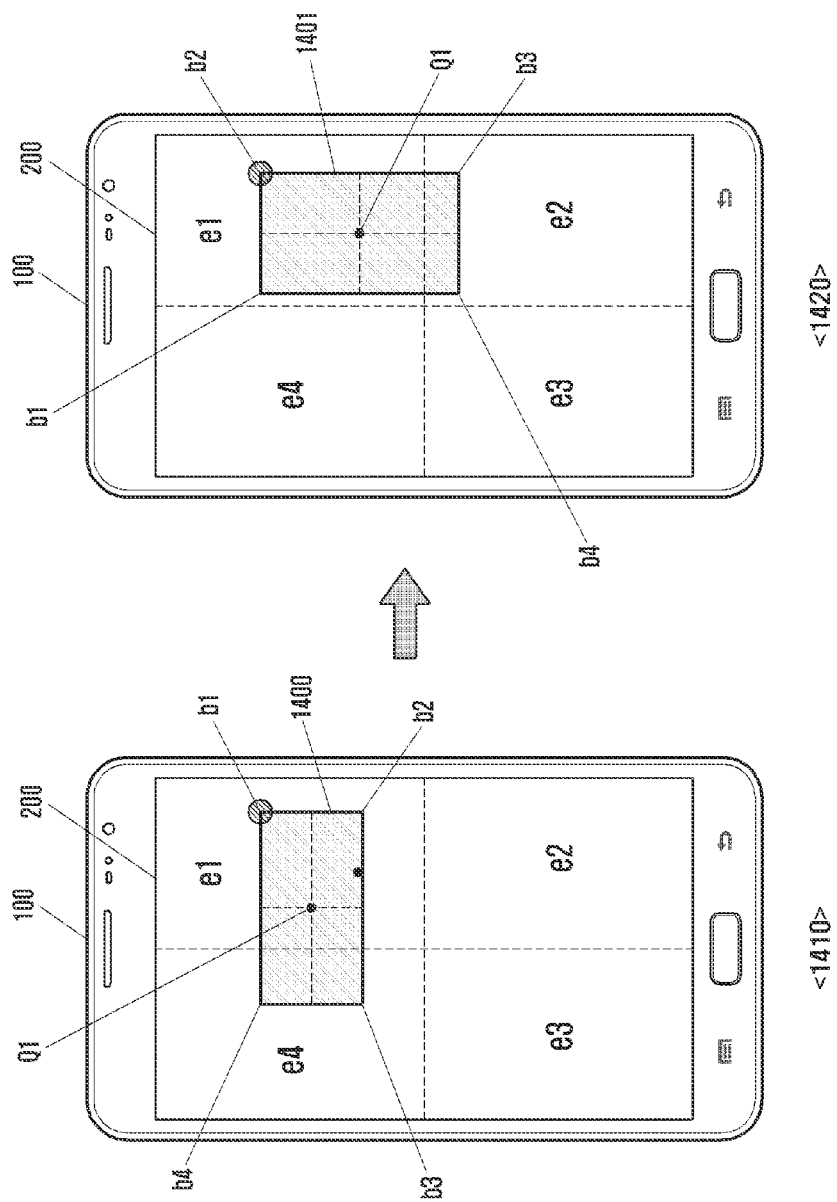

METHOD FOR CONTROLLING WINDOW AND ELECTRONIC DEVICE FOR SUPPORTING THE SAME

CROSS-REFERENCE TO RELATED APPLICATION(S)

This application claims the benefit under 35 U.S.C. §119(a) of a Korean patent application filed on Sep. 25, 2013 in the Korean Intellectual Property Office and assigned Serial number 10-2013-0113600, the entire disclosure of which is hereby incorporated by reference.

TECHNICAL FIELD

The present disclosure relates to a method for controlling a window and an electronic device for supporting the same. More particularly, the present disclosure relates to a method for controlling a window and an electronic device for supporting the same by which the window can be maintained within a screen area even though the property of the window is changed.

BACKGROUND

As a result of the development of technologies, users can use various multimedia content and applications through electronic devices. The technology to execute a window output function, the property of which is changeable, has been developed in order to concurrently output various content on a screen area of the electronic device.

For example, while an execution image for reproducing a moving image is displayed in the screen area of the electronic device, an image for executing another function may be displayed on the reproduced moving image. For example, an image for executing another function may be displayed on the uppermost layer of a current image for executing a certain function. This is called a pop-up function.

With such a window output function, of which property is changeable, the user can use, for example, applications for searching with an Internet browser and messaging while watching the moving image.

Applications using various pop-up windows such as a pop-up player, a pop-up browser, a pop-up dictionary, or the like, which are included in the pop-up function, have been introduced.

Meanwhile, in the case of using the pop-up window, the user can conveniently use various applications in the limited screen area of the electronic device, but may have a problem that current execution images are covered with the pop-up window.

Accordingly, the user has to change the property of the pop-up window by moving the pop-up window or adjusting the size thereof. At this time, the pop-up window may move from the screen area due to the change of the property of the pop-up window.

FIGS. 1A and 1B illustrate screen areas in which a window is displayed according to the related art.

For example, as shown in FIG. 1A, a pop-up window 20 that is displayed vertically in the screen area of an electronic device 10 is rotated to a horizontal position by the user. However, the right side of the pop-up window may not be seen due to the rotation of the pop-up window from the vertical position to the horizontal position. For example, a portion of the rotated pop-up window leaves the screen area, so that the user cannot view the whole content displayed in the pop-up window. Accordingly, the user has to move the rotated pop-up window 22 within the screen area.

Likewise, as shown in FIG. 1B, the user may enlarge a pop-up window 30 displayed in the screen area of the electronic device 10. However, a portion of the pop-up window 30 may move from the screen area due to the enlargement of the pop-up window 30 so that the user cannot view the portion of the pop-up window. Accordingly, the user has to move the enlarged pop-up window 32 within the screen area.

As described above, when the property of the pop-up window is changed in the electronic device according to the related art, the pop-up window may move from the screen area. Therefore, the user has to move the pop-up window to be maintained within the display, which is inconvenient because such movement of the pop-up window requires an additional operation of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an electronic device thereof, by which a window may be automatically maintained within the screen area even though the property of the window is changed. Particularly, the present disclosure provides a method for automatically controlling a window and an electronic device for supporting the same, by which the window may be maintained within the screen area even though the size or the location of the window is changed by the user.

In accordance with an aspect of the present disclosure, a method for controlling a window, of which property is changeable is provided. The method includes executing the window, configuring a reference point of the window according to a predetermined reference, receiving a request for changing a property of the window, in response to receiving the request for changing the property of the window is received, changing the property of the window on the basis of the reference point, and reconfiguring the reference point of the property-changed window.

In accordance with another aspect of the present disclosure, an electronic device for supporting a window control is provided. The electronic device includes a display unit configured to display a window and a controller configured to configure the reference point of the window according to a predetermined reference, to receive a request for changing a property of the window, and to change the property of the window on the basis of the reference point in response to receiving the request for changing the property of the window.

According to a method for controlling a window and an electronic device for supporting the same of the present disclosure, although the property of the window is changed, the window does not get out of the screen area, and the size or the location of the window is automatically changed, so that the window can be maintained within the screen area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4, 5, 6, 7, 8, 9, 10, 11, 12, 13, and 14 illustrate examples of a method for controlling a window according to an embodiment of the present disclosure.

Throughout the drawings, it should be noted that like reference numbers are used to depict the same or similar elements, features, and structures.

DETAILED DESCRIPTION

Figure 1A:
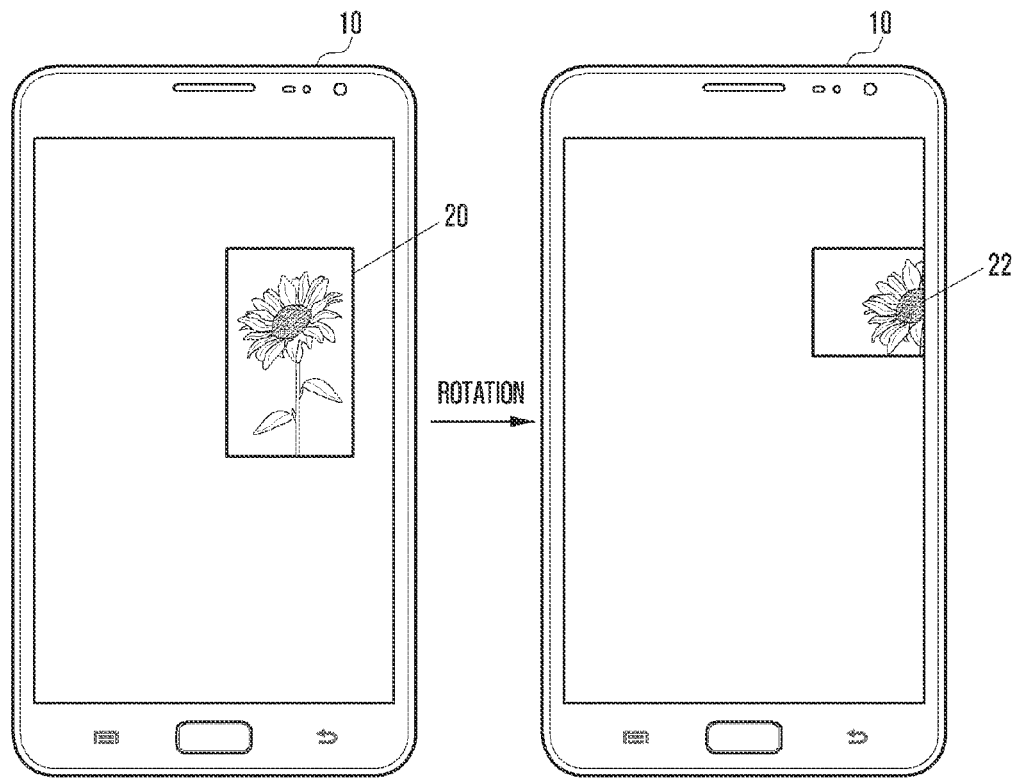
FIGS. 1A and 1B illustrate screen areas in which a window is displayed according to the related art.
Figure 1B:
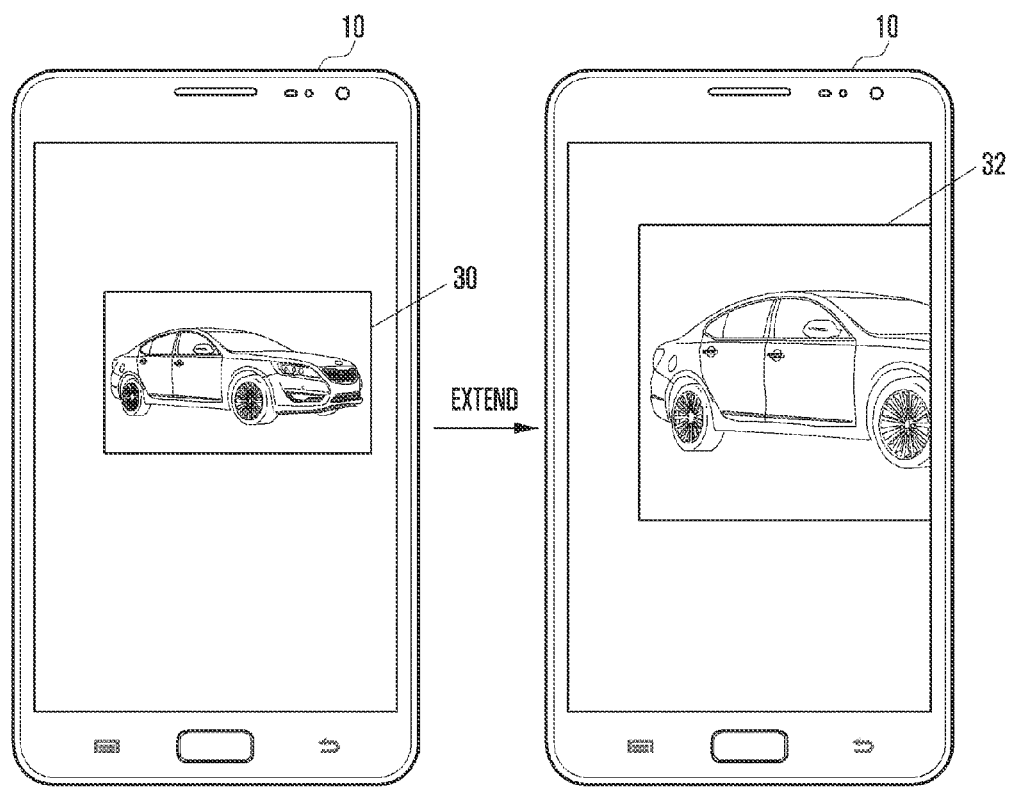

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Hereinafter, a method for controlling a window according to the present disclosure will be described in detail. Prior to making a detailed description of the present disclosure, the terms and words used in the present specification and claims should not be interpreted as being limited to their typical meaning based on the dictionary definitions thereof, but should be interpreted to have the meaning and concept relevant to the technical spirit of the present disclosure. Thus, because the following description and the accompanying drawings do not represent all technical spirits of the present disclosure, but merely indicate the preferred embodiment of the present disclosure, it has to be understood that there may be various equivalents and modifications which can be substituted for the embodiment at a time of filing this application. Further, in the accompanying drawings, some structural elements are exaggeratingly or schematically shown, or omitted, and each structural element is not wholly shown in an actual size. Thus, the present disclosure is not limited by the relative size or interval drawn in the accompanying drawings.

Figure 2:
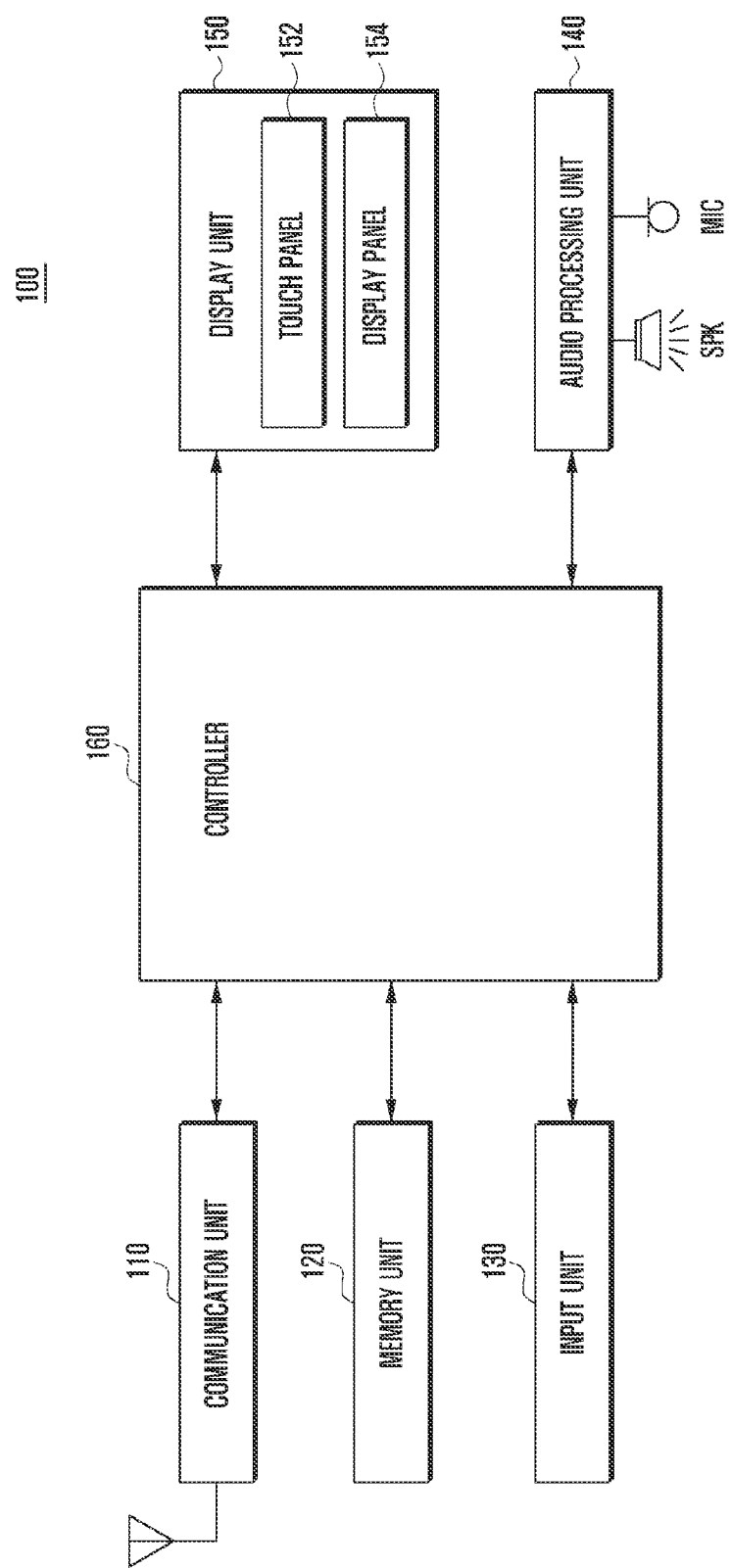
FIG. 2 is a block diagram of an electronic device according to an embodiment of the present disclosure.

FIG. 2 is a block diagram of an electronic device according to an embodiment of the present disclosure.

Referring to FIG. 2, the electronic device 100, according to various embodiments of the present disclosure, includes a communication unit 110, a memory unit 120, an input unit 130, an audio processing unit 140, a display unit 150, a controller 160, and/or the like. The audio processing unit 140 may include a speaker SPK, a microphone MIC, and/or the like.

The display unit 150 displays images on a screen under the control of the controller 160. For example, the controller 160 processes (e.g., decodes) data into images to be displayed on the screen and stores the same in a buffer, and the display unit 150 transforms the images stored in the buffer into analog signals to be displayed on the screen. Upon the supply of power, the display unit 150 displays a locked image on the screen. When unlocking information is detected during the display of the locked image, the controller 160 releases the locked state. For example, the display unit 150 displays another image instead of the locked image under the control of the controller 160. The unlocking information may be texts (e.g., 1234) entered to the electronic device 100 by the user using a keypad displayed on the screen of the display unit 150 or the input unit 130, paths, directions or types of user touches with respect to the display unit 150, or voice data of the user input to the electronic device 100 through the microphone MIC. Meanwhile, another image may be a home image, an application execution image (e.g., moving images, web pages, and/or the like), a keypad, a list, and/or the like. The home image includes a background image and a plurality of icons displayed on the background image. The icons denote applications (hereinafter referred to as App) or data (e.g., photo files, video files, recording files, documents, messages, and/or the like). When the user selects (e.g., taps) one (e.g., in response to a user selecting an icon), for example, an application icon, among the icons, the controller 160 executes the corresponding App (e.g., an App providing SNS) and controls the display unit 150 to display the execution image.

The display unit 150 displays the images in multi-layers on the screen under the control of the controller 160. For example, the display unit 150 displays the first image (e.g., the home image or the web page) on the screen, and displays the second image (e.g., the moving image) on the first image. At this time, the first image may be displayed over the whole area of the screen, and the second image may be displayed on the portion of the screen. Accordingly, the user can still view the portion of the first image. In addition, the display unit 150 may display the second image to be transparent under the control of the controller 160. As a result, the user can view the entirety of the first image.

The display unit 150 may always display a predetermined image, particularly, a pop-up window, on the uppermost layer of the screen under the control of the controller 160. For example, a web browser is executed by the user, and a web page is displayed on the screen according to the execution of the web browser. At this time, the controller 160 controls the display unit 150 to display the pop-up window on the upper layer of the web page.

The display unit 150 may include a touch panel 152 and a display panel 154.

The display unit 150 may be configured with Liquid Crystal Displays (LCDs), Organic Light Emitting Diodes (OLEDs), Active Matrix Organic Light Emitting Diodes (AMOLEDs), flexible displays, and/or the like.

A touch panel 152 may be placed on the display unit 150. Specifically, the touch panel 152 may be implemented by an add-on type in which the touch panel is located on the screen, or an on-cell type or an in-cell type in which the touch panel is inserted into the display unit 150.

The touch panel 152 generates analog signals in response to user's gestures (e.g., a touch event) with respect to the touch panel 152, and transforms the analog signals into digital signals to be thereby transferred to the controller 160. The touch event includes coordinates (x, y) of the touch. When the coordinates of the touch is received from the touch panel 152, the controller 160 determines that touching means (e.g., fingers or pens) has touched the touch panel 152. In contrast, when the coordinates of the touch is not received from the touch panel 152, the controller 160 determines that the touch has been removed. In addition, when the coordinate of the touch is changed from $(x_1, y_1)$ to $(x_2, y_2)$, the controller 160 determines that the touch (e.g., the touching means) has moved. The controller 160 calculates the amount of locational change (dx, dy) and the movement speed of the touching means in response to the movement of the touching means.

The controller 160 determines that the user's gesture is one of a touch, a multi-touch, a tap, a double tap, a long tap, a tap and touch, a drag, a flick, a press, a pinch-in, a pinch-out, and/or the like, based on the coordinates of the touch, the removal of the touch of the touching means, the movement of the touching means, the amount of the locational change of the touching means, and the movement speed of the touching means.

The touch may correspond to a gesture in which the user makes the touching means touches a certain point of the touch panel 152 of the screen. The multi-touch may correspond to a gesture in which several touching means (e.g., a thumb and an index finger) touch several points of the touch panel. The tap may correspond to a gesture in which the touching means touches a certain point of the touch panel and is then removed without movement thereof. The double tap may correspond to a gesture of consecutively tapping a certain point twice. The long tap may correspond to a gesture in which the touching means touches a certain point of the touch panel for a relatively long time and is then removed without movement thereof. The tap and touch may correspond to a gesture of tapping a certain point of the touch panel and touching the same point again within a predetermined time (e.g., 0.5 seconds). The drag may correspond to a gesture in which the touching means touches a certain point and moves in a predetermined direction with the touch maintained. The flick may correspond to a gesture in which the touching means moves faster than the drag and is then removed. The press may correspond to a gesture of touching and pressing a certain point of the touch panel. The pinch-in may correspond to a gesture in which two touching means concurrently touch two points and then move close to each other. The pinch-out may correspond to a gesture in which two touching means concurrently touch two points and then move far from each other. For example, the touch refers to a state of being in contact with the touch panel 152, and the other gestures refer to the change of the touch.

The touch panel 152 may be a combined touch panel that is comprised of a hand touch panel for detecting a hand gesture and a pen touch panel for detecting a pen gesture. The hand touch panel may be in the form of a capacitive type. Alternatively, the hand touch panel may be configured with a resistive type, an infrared type, an ultrasonic type, and/or the like. In addition, the hand touch panel may generate a touch event not only by a user's hand gesture but also by other objects (e.g., objects of conductive material causing the change of capacitance). The pen touch panel may be in the form of an electromagnetic induction type. Accordingly, the pen touch panel generates a touch event by a stylus pen that is specially manufactured to form a magnetic field. Meanwhile, the touch panel 152 may include a pressure sensor that detects a pressure at the touch point. The detected pressure is transferred to the controller 160, and the controller 160 may distinguish the touch from the press on the basis of the detected pressure. The pressure information may be detected in other ways.

The input unit 130 may include a multitude of keys to input numeral or text information and to configure various functions. The keys may include a menu key, a screen-on/off key, a power-on/off key, a volume adjustment key, and the like. The input unit 130 generates key events related to a user setup and a functional control of the electronic device 100 and transfers the same to the controller 160. The key events may include a power-on/off event, a volume adjustment event, a screen-on/off event, a shutter event, and the like. The controller 160 controls the above-described elements in response to the key events. Meanwhile, the keys of the input unit 130 may be referred to as hard keys, and virtual keys displayed on the display unit 150 may be referred to as soft keys.

The memory unit 120 may be a secondary memory of the controller 160, and may include a disc, a Random Access Memory (RAM), a Read-Only Memory (ROM), a flash memory, and/or the like.

The memory unit 120 stores data (e.g., contact information) generated in the electronic device 100 and data (e.g., messages and moving image files) received from the outside through the communication unit 110.

The memory unit 120 may include size information of images (e.g., a keypad, moving images, messages, and/or the like), display area information of the images, and/or the like. Provided that minimum unit of the screen is a pixel, the size information may be, for example, "x*y". "x" denotes the x-th pixel on the x-axis, and "y" denotes the y-th pixel on the y-axis. The display area information may be, for example, four coordinates (e.g., (x1, y1), (x1, y2), (x2, y1), and (x2, y2)). Alternatively, the display area information may be a single coordinate.

The memory unit 120 may include setup values (e.g., the value indicating automatic adjustment of the brightness of the screen, the value indicating the use of Bluetooth, the value indicating the use of the pop-up function, the value indicating the use of a location change table, and/or the like).

The memory unit 120 may store a booting program, an Operating System (OS), applications, and/or the like. The OS plays a role of an interface between hardware and applications, and between applications, and manages computer resources such as a Central Processing Unit (CPU), a Graphic processing Unit (GPU), a main memory, a secondary memory, and/or the like. In addition, the OS controls operations of the hardware and the execution of applications, determines the task sequence, controls calculation of the CPU and GPU, and manages storage of data and files. The applications may be divided into embedded applications and third party applications. For example, the embedded applications may be web browsers, email programs, instant messengers, and/or the like. The third party applications is received from App-market servers to the electronic device 100, and installed therein. When the power is supplied to the controller 160 from a battery, the booting program is loaded in the main memory (e.g., a RAM) of the controller 160. Such a booting program loads the OS to the main memory. The OS loads applications, for example, a moving image player, to the main memory.

The memory unit 120 may include a Speech-To-Text (STT) program for transforming voice data to text data. In addition, the memory unit 120 may include an artificial intelligence program that analyzes the voice data to recognize the user's intention. Specifically, the artificial intelligence program includes a natural language processing engine that recognizes the context of the voice data, an inference engine that infers the user's intention from the recognized context, and a dialog engine that converses with the user on the basis of the recognized context.

The communication unit 110 performs voice communication, video communication, or data communication with external devices through networks under the control of the controller 160. The communication unit 110 includes a radio frequency transmitter for modulating and amplifying the frequency of a signal to be transmitted, and a radio frequency receiver for low-noise-amplifying a received signal and demodulating the frequency thereof. In addition, the communication unit 110 includes a mobile communication module (e.g., a 3-Generation mobile communication module, a 3.5-Generation mobile communication module, a 4-Genaration mobile communication module, and/or 4-Generation mobile communication module, and/or the like), a digital broadcasting module (e.g., a DMB module), and a short range communication module (e.g., a Wi-Fi module, a Bluetooth module, a Near Field Communication (NFC) module) and/or the like.

The audio processing unit 140 is combined with the speaker SPK and the microphone MIC to output and input audio signals (e.g., voice data) for voice recognition, voice recording, digital recording, and a phone call. The audio processing unit 140 receives the audio signals from the controller 160, and converts the received audio signals to analog signals to be thereby amplified and output through the speaker SPK. The audio processing unit 140 converts audio signals received from the microphone MIC to digital signals and provides the same to the controller 160. The speaker SPK converts the audio signals received from the audio processing unit 140 to sound waves to be thereby output. The microphone MIC converts sound waves received from people or other sound sources to audio signals.

The controller 160 controls overall operations of the electronic device 100 and signal flows between internal elements of the electronic device 100. In addition, the controller 160 performs a data processing function, and controls the power supply from the battery to the elements. The controller 160 includes a CPU and a GPU. The CPU is a core control unit of a computer system, which performs calculations and comparisons of data, interpretations and the execution of instructions, and/or the like. The GPU is a graphic control unit, which performs calculations and comparisons of data, and interpretations and the execution of instructions, in relation to images on behalf of the CPU. The CPU and the GPU may be integrated into a single package in which two or more independent cores (e.g., quadruple cores) are configured in the form of a single integrated circuit. In addition, the CPU and the GPU may be implemented by a System-on-Chip (SoC). Further, the CPU and the GPU may be a package of a multi-layer. Meanwhile, an element including the CPU and the GPU may be referred to as an Application Processor (AP).

The controller 160 includes a main memory (e.g., a RAM). The main memory stores various programs, for example, a booting program, a host OS, guest OSs, and applications, which are loaded from the memory unit 120. For example, the CPU and the GPU of the controller 160 access the above applications, and decode instructions of the programs to thereby perform the corresponding functions (e.g., a pop-up function). In addition, the controller 160 includes a cache memory that temporarily stores data to be written in the memory unit 120 and data read from the memory unit 120.

The controller 160 manages the electronic device 100 by using the size information and the display area information stored in the memory unit 120. For example, when an event for requesting the display of the keypad occurs, the controller 160 reads the size information and the display area information corresponding to the keypad from the memory unit 120, and controls the display unit 130 to display the keypad in the corresponding display area, based on the read information.

The controller 160 manages the electronic device 100 by using setup values stored in the memory unit 120. For example, with the moving image displayed, the controller 160 reads the value indicating the use of the pop-up window function from the memory unit 120, and determines the use of the pop-up window function, based on the value. Alternatively, the execution of the pop-up window function may be determined regardless of the corresponding setup value. For example, the display unit 150 displays a pop-up window function key together with the moving image. This button may be displayed to be translucent on the moving image or in the separate area. If the user selects the button, the controller 160 performs the pop-up window function. At this time, "ON" may be shown on the button. If the user selects the button again, the controller 160 terminates the pop-up window function. At this time, "OFF" may be shown on the button. Images applied to the pop-up window are not limited to the moving images, and may be other images (e.g., photos, still images, memos, map information, and/or the like). For example, the pop-up window that displays other images as well as the moving images may be displayed on the uppermost layer of the screen.

The controller 160 configures a reference point of the window, of which property is changeable, such as the pop-up window, according to a predetermined reference. The predetermined reference for configuring the reference point of the property-changeable window may be configured by a designer at the time of manufacturing the electronic device, or by a user after sales. The reference point of the property-changeable window may be the base that is used for changing the property of the window.

When a request for changing the property of the window is received, the controller 160 changes the property of the window, based on the configured reference point. For example, the controller 160 may increase or reduce the size of the window, move the window in the screen area, rotate the window at a predetermined angle, or transform the shape of the window on the basis of the reference point.

Afterwards, the controller 160 reconfigures the reference point of the window of which property has been changed. For example, if the size or the location of the window is changed, or if the window is rotated at a predetermined angle on the basis of the reference point, the location coordinates of the window are changed. Accordingly, the controller 160 reconfigures the reference point of the property-changed window. This will be described in detail with reference to the drawings later.

Meanwhile, according to a trend of convergence of digital devices, the electronic device 100 may further include other elements, which are not described here, such as a camera, a GPS module, a vibrating motor, accessories, external device interfaces (e.g., an earjack), an acceleration sensor, and/or the like. The accessories refer to components which are detachable from the electronic device 100, such as, for example, pens for touching the screen of the display unit 150. In addition, some elements of the electronic device 100 may be removed, or other elements may be added.

Figure 3:
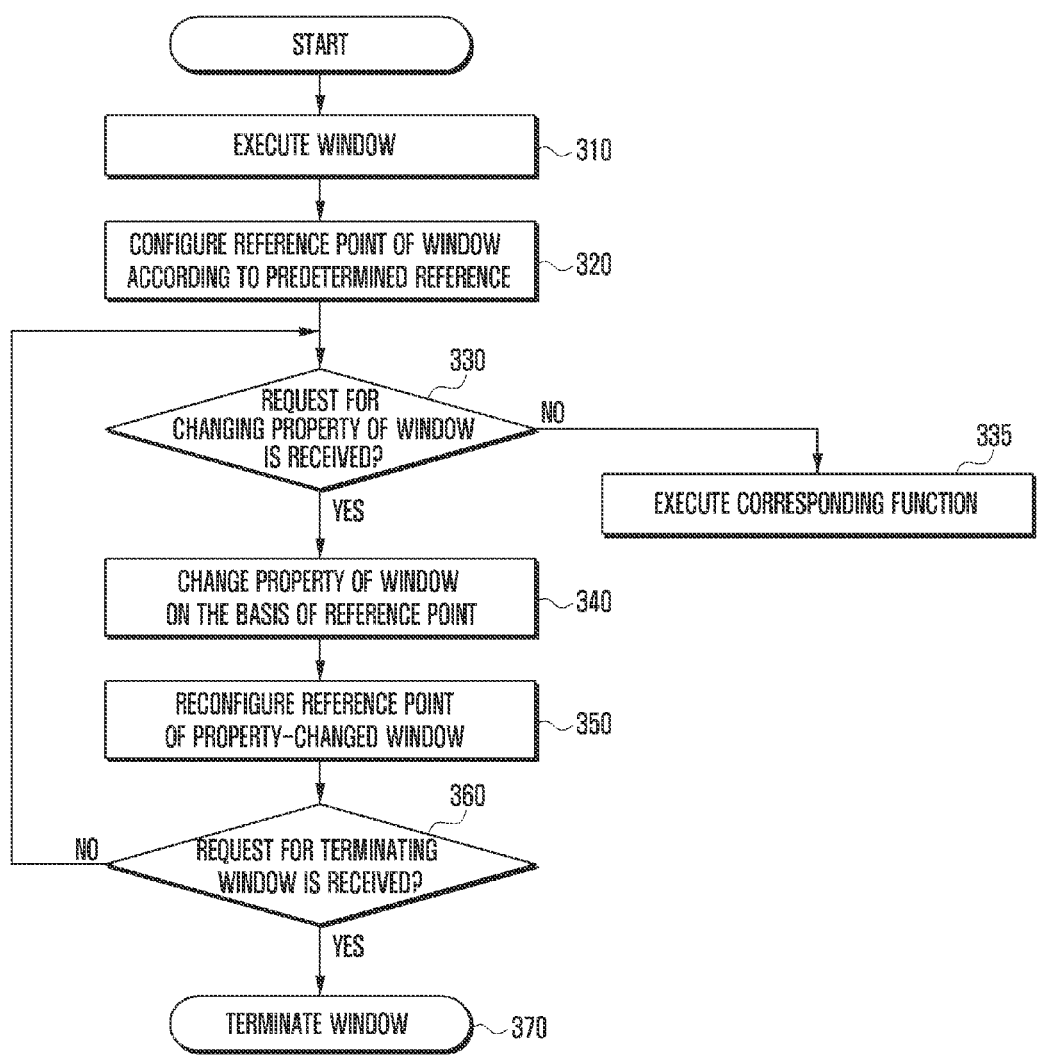
FIG. 3 is a flowchart illustrating a method for controlling a window according to an embodiment of the present disclosure.

FIG. 3 is a flowchart illustrating a method for controlling a window according to an embodiment of the present disclosure.

Referring to FIG. 3, at operation 310, the controller 160 executes a window. For example, the controller 160 executes the window by the user's request, or while a specific application is executed, the window related to the execution of the application may be automatically executed. The controller 160 may place the window at a predetermined position in a predetermined size as a default in the screen area of the electronic device 100. It is assumed that the window is changeable in a property thereof such as, the size, the shape, the position thereof in the screen area, and/or the like.

At operation 320, the controller 160 configures a reference point of the window according to the predetermined reference. The predetermined reference for configuring the reference point of the window may be configured by a designer at the time of manufacturing the electronic device, or by a user after sales. The reference point of the window may be the base that is used for changing the property of the window.

The controller 160 may configure the reference point according to distances between specific coordinates of the window and the screen area. The distances between the specific coordinates may be distances between each corner of the window and each corner of the screen area. Alternatively, the distances between the specific coordinates may be distances between centers of sides of the window and the corners of the screen area. Alternatively, the distances between the specific coordinates may be distances between the center point of the window and the corners of the screen area.

According to various embodiments of the present disclosure, the controller 160 may divide the screen area into division areas which have the same ratio of area so that each of the division areas respectively has one corner of the screen area. Thereafter, the controller 160 may detect the division area in which the center point of the window is located, and detect the corner of the window, which belongs to the detected division area, to thereby configure the detected corner of the window to be the reference point.

Alternatively, the controller 160 may detect the division area that has the highest ratio at which the window occupies each of the division areas, and then configure the corner of the window, which belongs to the detected division area, to be the reference point.

The predetermined reference for configuring the reference point by the controller 160 will be described in detail with reference to FIGS. 4 to 14 later.

At operation 330, the controller 160 determines whether a request for changing the property of the window is received.

For example, the controller 160 may detect a user's touch event for changing the location or the size of the pop-up window that is displayed in the screen area. For example, the touch event may be at least one of a sweep, a flick, a drag, a drag and drop, a tap, a multi-touch, a double tap, a long tap, a tap and touch, a press, a pinch-in, a pinch-out, and/or the like, which are input in response to the pop-up window.

If the controller 160 determines that the request for changing the property of the window is not received at operation 330, then the controller 160 may proceed to operation 335 at which the controller 160 performs a corresponding function.

In contrast, if the controller 160 determines that the request for chancing the property of the window is received at 330, then the controller 160 proceeds to operation 340 at which the controller 160 changes the property of the window on the basis of the reference point that is configured at operation 320. For example, the controller 160 may increase or reduce the size of the window, move the window within the screen area, or rotate the window at a predetermined angle.

Thereafter, at operation 350, the controller 160 reconfigures the reference point of the property-changed window. For example, if the size, the location, and/or the like of the window is changed, or if the window is rotated at the predetermined angle on the basis of the reference point, then the location coordinates of the window are changed. Accordingly, the controller 160 reconfigures the reference point of the property-changed window. The reference point of the property-changed window may be configured as the same as the predetermined reference of operation 320.

At operation 360, the controller 160 determines whether a request for terminating the window is received. If the controller 160 determines that a request for terminating the window is received (e.g., in response to receipt of the request for termination of the window) at operation 360, then the controller 160 may proceed to operation 370 at which the controller 160 terminates the window. In contrast, if the controller 160 determines that the request for termination of the window is not received at operation 360, then the controller 160 returns to operation 330 to determine whether the request for the change of the window property is received.

FIGS. 4 to 14 illustrate examples of a method for controlling a window according to an embodiment of the present disclosure.

Figure 4:
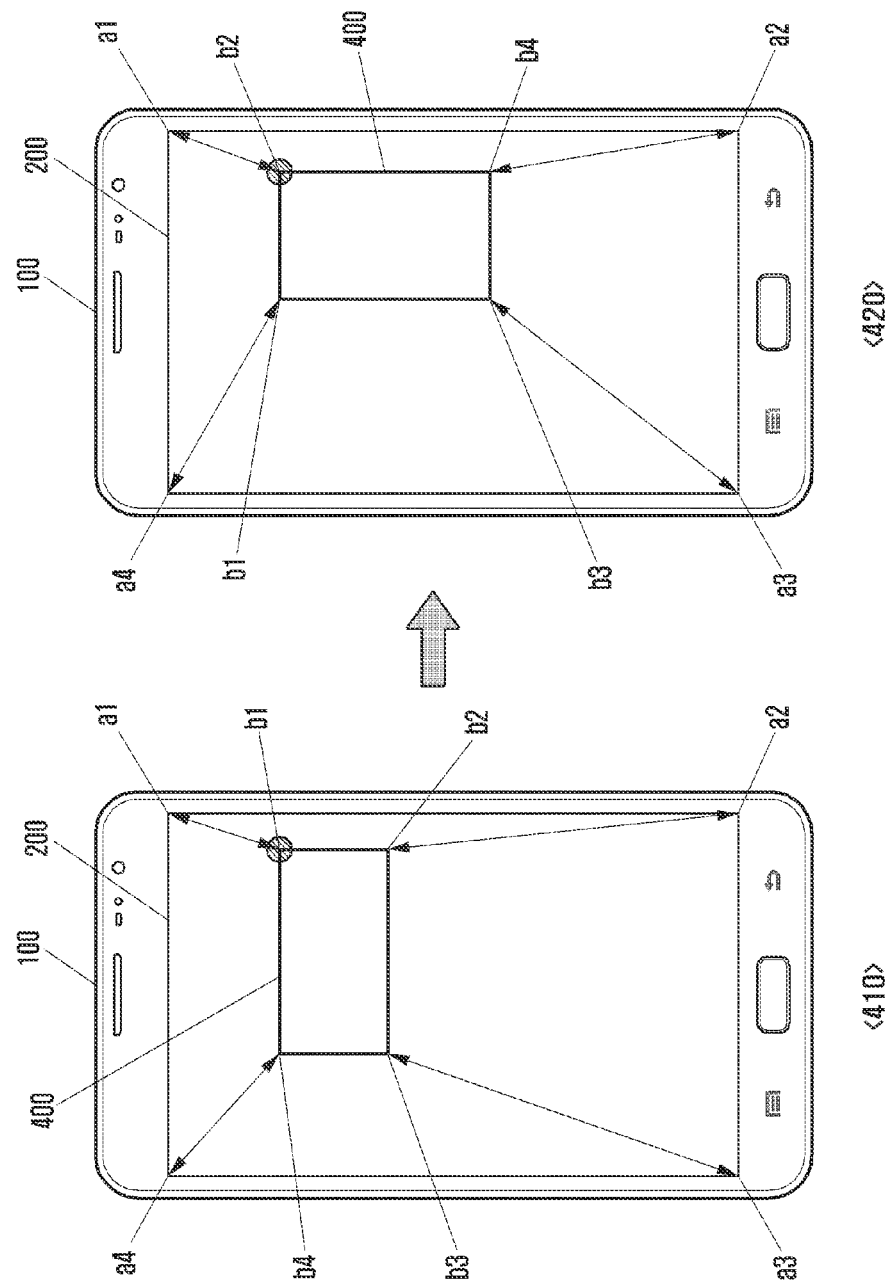

FIG. 4 illustrates an example in which distances between specific coordinates of the window and the screen area are measured, and the reference point to be used for changing the property of the window is configured on the basis of the measured distances according to the embodiment of the present disclosure.

Referring to FIG. 4, as shown in execution diagram 410, a window 400 having a predetermined size is initially displayed at the defaulted position in the screen area 200.

In general, the screen area 200 may be configured as a display area of the electronic device 100. The screen area 200 may have boundaries in various shapes. For example, the screen area 200 has a rectangular shape in the present example. The rectangular screen area 200 includes the first corner a1, the second corner a2, the third corner a3, and the fourth corner a4. The corners correspond to vertexes of the rectangle.

The window 400 may have boundaries in various shapes. For example, the window 400 has a rectangular shape of boundary in the present example. According to various embodiments of the present disclosure, the window 400 may have various boundaries such as a circle, a polygon, and/or the like as well as the rectangle. The rectangular window 400 includes the first corner b1, the second corner b2, the third corner b3, and the fourth corner b4.

The controller 160 measures distances between the corners b1 to b4 of the window 400 and the corners a1 to a4 of the screen area 200. In addition, the controller 160 detects the shortest distance among the measured distances. The controller 160 detects the corner of the window 400, which corresponds to the shortest distance, and configures the detected corner of the window 400 to be the reference point.

In execution diagram 410, the distance between the first corner a1 of the screen area and the first corner b1 of the window is shortest. Accordingly, the first corner b1 of the window is configured to be the reference point.

Provided that a minimum unit constituting the screen area 200 is a pixel, the size information of the screen area 200 may be, for example, "x*y". "x" denotes the x-th pixel on the x-axis, and "y" denotes the y-th pixel on the y-axis. Accordingly, the reference point may be configured with coordinate information such as (x, y).

In execution diagram 410, after the first corner b1 of the window 400 is configured to be the reference point, a request for rotating the window 400 at a predetermined angle may be received. In response to reception of the request for rotating the window 400 at a predetermined angle, the controller 160 rotates the window 400 on the basis of the first corner b1 as shown in execution diagram 420.

According to various embodiments of the present disclosure, because the reference point of the window is configured, and the property of the window is changed based on the reference point, the property-changed window can be maintained within the screen area.

Meanwhile, with the rotation of the window 400, the location coordinate property of the window 400 is changed. The controller 160 reconfigures the reference point of the window 400 of which location coordinate property has been changed. At this time, the reference point of the window 400 may be reconfigured according to the predetermined reference applied in execution diagram 410.

For example, the controller 160 measures distances between the corners b1 to b4 of the window 400, of which location coordinate property has been changed, and the corners a1 to a4 of the screen area 200, and detects the shortest distance among the measured distances. Further, the controller 160 detects the corner of the window 400, which corresponds to the shortest distance, and configures the detected corner of the window 400 to be the reference point.

In execution diagram 420, the second corner b2 of the window 400 is detected to have the shortest distance among the measured distances between the corners b1 to b4 of the window 400, of which location property has been changed, and the corners a1 to a4 of the screen area 200. Accordingly, the second corner b2 is reconfigured to be the reference point of the window 400.

The reference point of the window 400 may be dynamically changed according to the above-described method whenever the property of the window 400 is changed.

Figure 5:
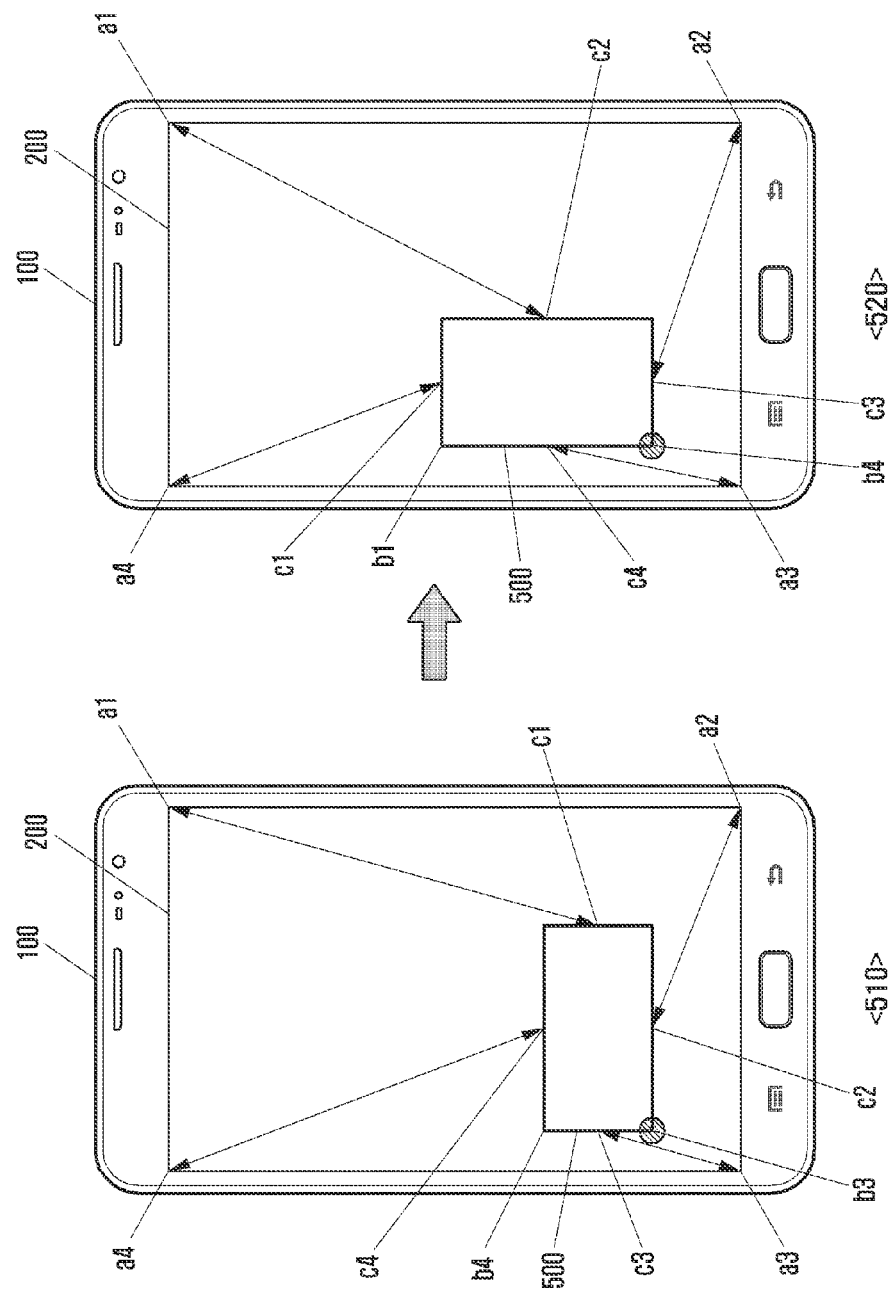

FIG. 5 illustrates an example in which distances between specific coordinates of the window and the screen area are measured, and the reference point to be used for changing the property of the window is configured on the basis of the measured distances according to the embodiment of the present disclosure.

The basic shape and configuration of the screen area and the window shown in FIG. 5 are the same as those in FIG. 4, so the detailed description thereof will be omitted here.

Referring to FIG. 5, as shown in execution diagram 510, a rectangular window 500 includes the first side c1, the second side c2, the third side c3, and the fourth side c4.

The controller 160 measures distances between the center of each of the sides c1 to c4 of the window 500 and each of the corners a1 to a4 of the screen area 200. In addition, the controller 160 detects the shortest distance among the measured distances. The controller 160 detects the side of the window 500, which corresponds to the shortest distance, and detects the corner of the window 500, which belongs to the detected side of the window 500 and has the shortest distance to the corners a1 to a4 of the screen area 200. The detected corner of the window 500 is configured to be the reference point.

In execution diagram 510, the distance between the center of the third side c3 and the third corner a3 is shortest. The third side c3 is detected to have the third corner b3 and the fourth corner b4 of the window 500. Among the third corner b3 and the fourth corner b4, the third corner b3 is detected to have the shorter distance to the adjacent corner of the screen area 200. Accordingly, the third corner b3 is configured to be the reference point.

In execution diagram 510, after the third corner b3 is configured to be the reference point, a request for rotating the window 500 at a predetermined angle is received. In response to reception of the request for rotating the window 500 at a predetermined angle, the controller 160 rotates the window 500 on the basis of the third corner b3 as shown in execution diagram 520.

According to various embodiments of the present disclosure, because the reference point of the window is configured, and the property of the window is changed based on the reference point, the property-changed window can be maintained within the screen area.

Meanwhile, with the rotation of the window 500, the location coordinate property of the window 500 is changed. The controller 160 reconfigures the reference point of the window 500 of which location coordinate property has been changed.

At this time, the reference point of the window 500 may be reconfigured according to the predetermined reference applied in execution diagram 510. For example, the controller 160 measures distances between the center of each of the sides c1 to c4 of the window 500, of which location coordinate property has been changed, and each of the corners a1 to a4 of the screen area 200, and detects the shortest distance among the measured distances to thereby detect the side corresponding thereto. Further, the controller 160 detects the corner which belongs to the detected side and has the shortest distance to the corners a1 to a4 of the screen area 200, and configures the detected corner to be the reference point of the window 500.

In execution diagram 520, the fourth side c4 of the window 500 is detected to have the shortest distance among the measured distances between the center of each of the sides c1 to c4 of the window 500, of which location property has been changed, and each of the corners a1 to a4 of the screen area 200. Among the first corner b1 and the fourth corner b4 of the fourth side c4, which belong to the fourth side c4, the fourth corner b4 is detected to have the shorter distance to the adjacent corner of screen area 200. According to this, the fourth corner b4 is reconfigured to be the reference point of the window 500.

The reference point of the window 500 may be dynamically changed according to the above-described method whenever the property of the window 500 is changed.

Figure 6:
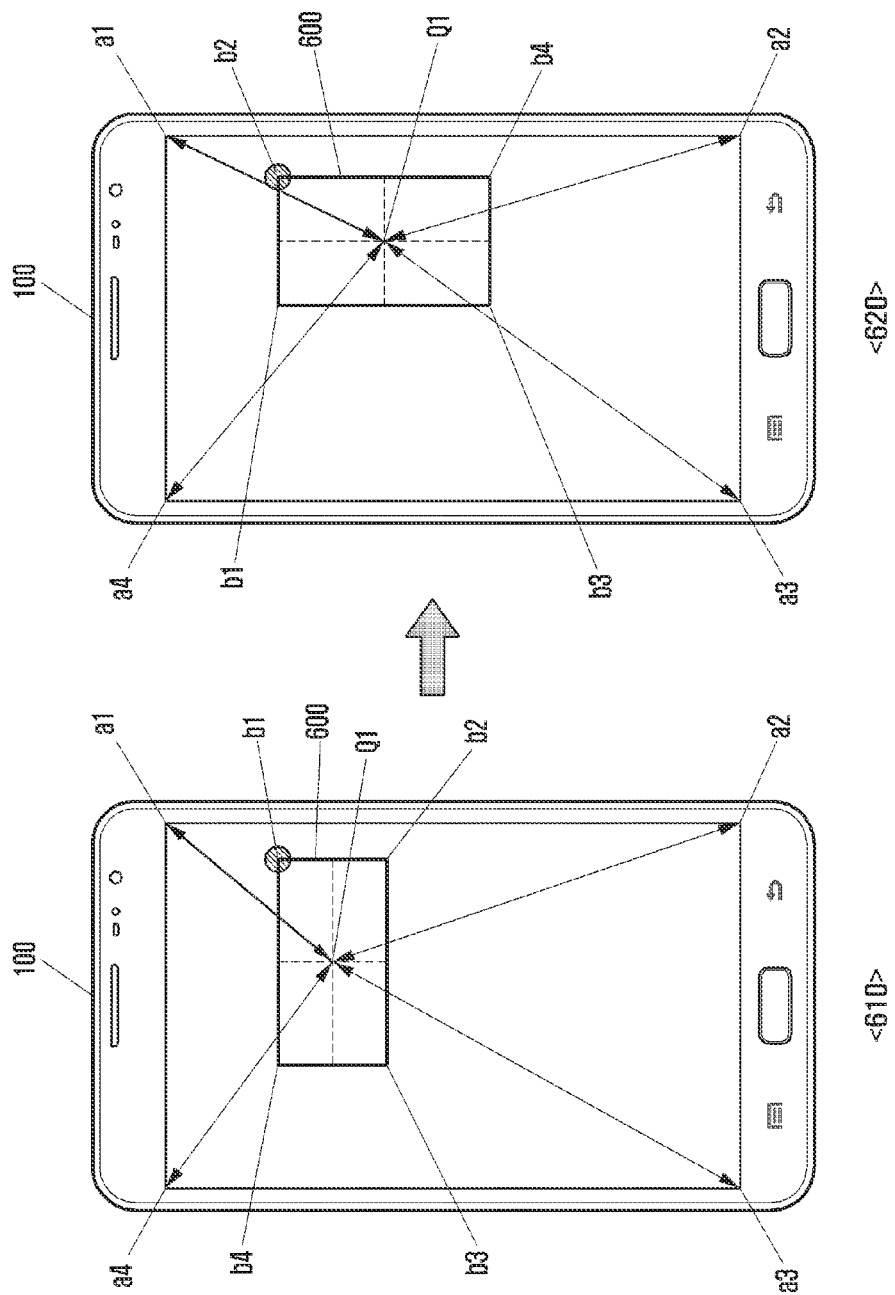

FIG. 6 illustrates an example in which distances between specific coordinates of the window and the screen area are measured, and the reference point to be used for changing the property of the window is configured on the basis of the measured distances according to the embodiment of the present disclosure.

Referring to FIG. 6, a rectangular window 600 includes a center point Q1.

The controller 160 measures distances between the center point Q1 of the window 600 and the corners a1 to a4 of the screen area 200. In addition, the controller 160 detects the shortest distance among the measured distances. The controller 160 detects the corner of the window 600 which is closest to the corner of the screen area 200, which corresponds to the shortest distance, and configures the detected corner of the window 600 to be the reference point.

In execution diagram 610, the distance between the center point Q1 and the first corner a1 is shortest. The first corner b1 of the window 600 is detected to be closest to the first corner a1. Accordingly, the first corner b1 is configured to be the reference point.

In execution diagram 610, after the first corner b1 is configured to be the reference point, a request for rotating the window 600 at a predetermined angle is received. In response to reception of the request for rotating the window at a predetermined angle, the controller 160 rotates the window 600 on the basis of the first corner b1 as shown in execution diagram 620.

In the present disclosure, because the reference point of the window is configured, and the property of the window is changed based on the reference point, the window can be maintained within the screen area.

Meanwhile, with the rotation of the window 600, the location coordinate property of the window 600 is changed. The controller 160 reconfigures the reference point of the window 600, of which location coordinate property has been changed.

At this time, the reference point of the window 600 may be reconfigured according to the predetermined reference applied in execution diagram 610. For example, the controller 160 measures distances between the center point Q1 of the window 600, of which location coordinate property has been changed, and the corners a1 to a4 of the screen area 200, and detects the shortest distance among the measured distances to thereby detect the corner of the screen area 200 corresponding thereto. Further, the controller 160 detects the corner of the window 600, which has the shortest distance to the detected corner of the screen area 200, and reconfigures the detected corner of the window 600 to be the reference point.

In execution diagram 620, the first corner a1 of the screen area 200 is detected to have the shortest distance among the measured distances between the center point Q1 of the window 500, of which location property has been changed, and the corners a1 to a4 of the screen area 200. The second corner b2 of the window 600 is detected to have the shortest distance among the measured distances between the first corner a1 and the corners a1 to a4 of the window 600. Accordingly, the second corner b2 is reconfigured to be the reference point of the window 600.

The reference point of the window 600 may be dynamically changed according to the above-described method whenever the property of the pop-up window 600 is changed.

Figure 7:
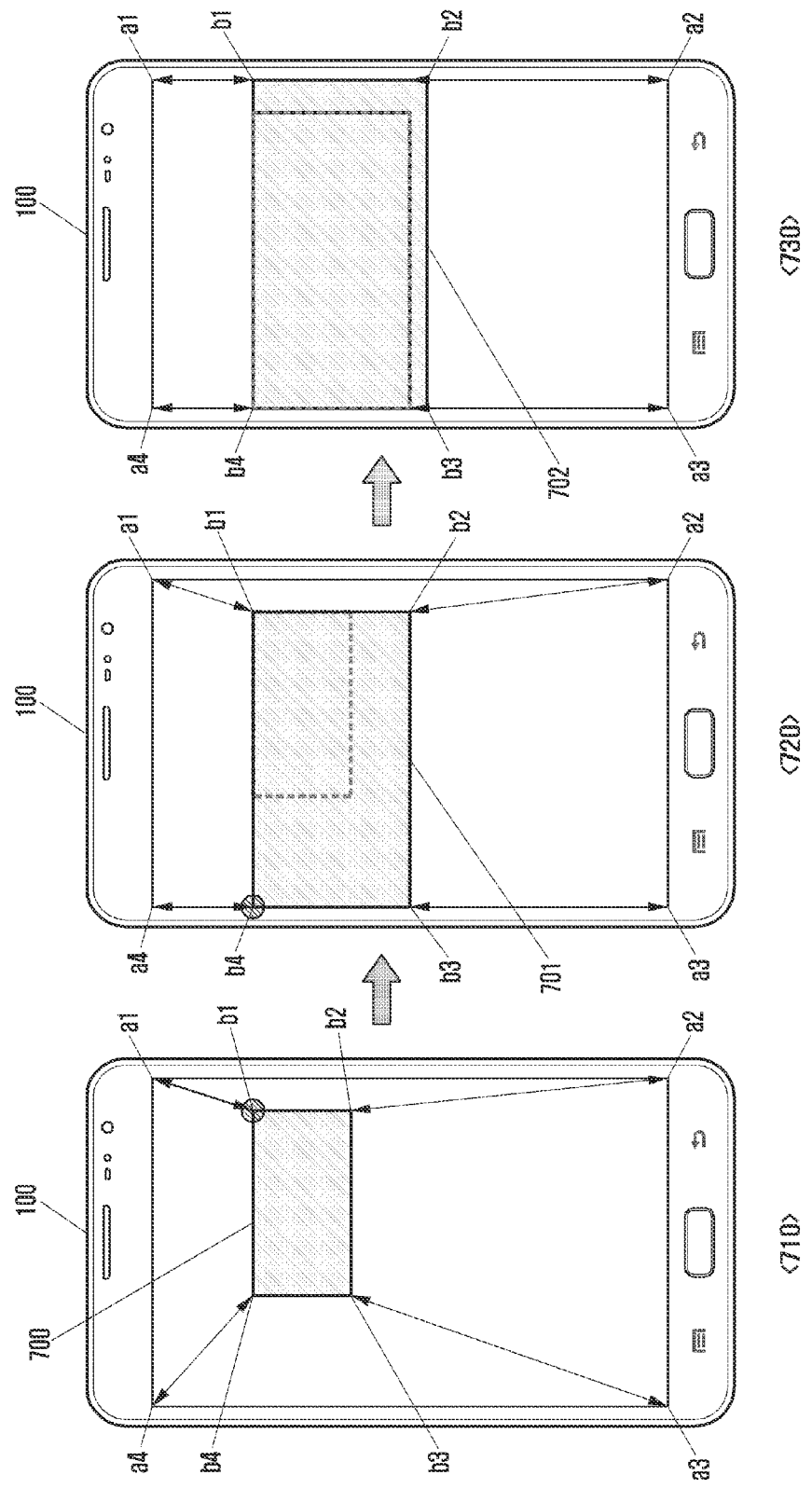
Figure 8:
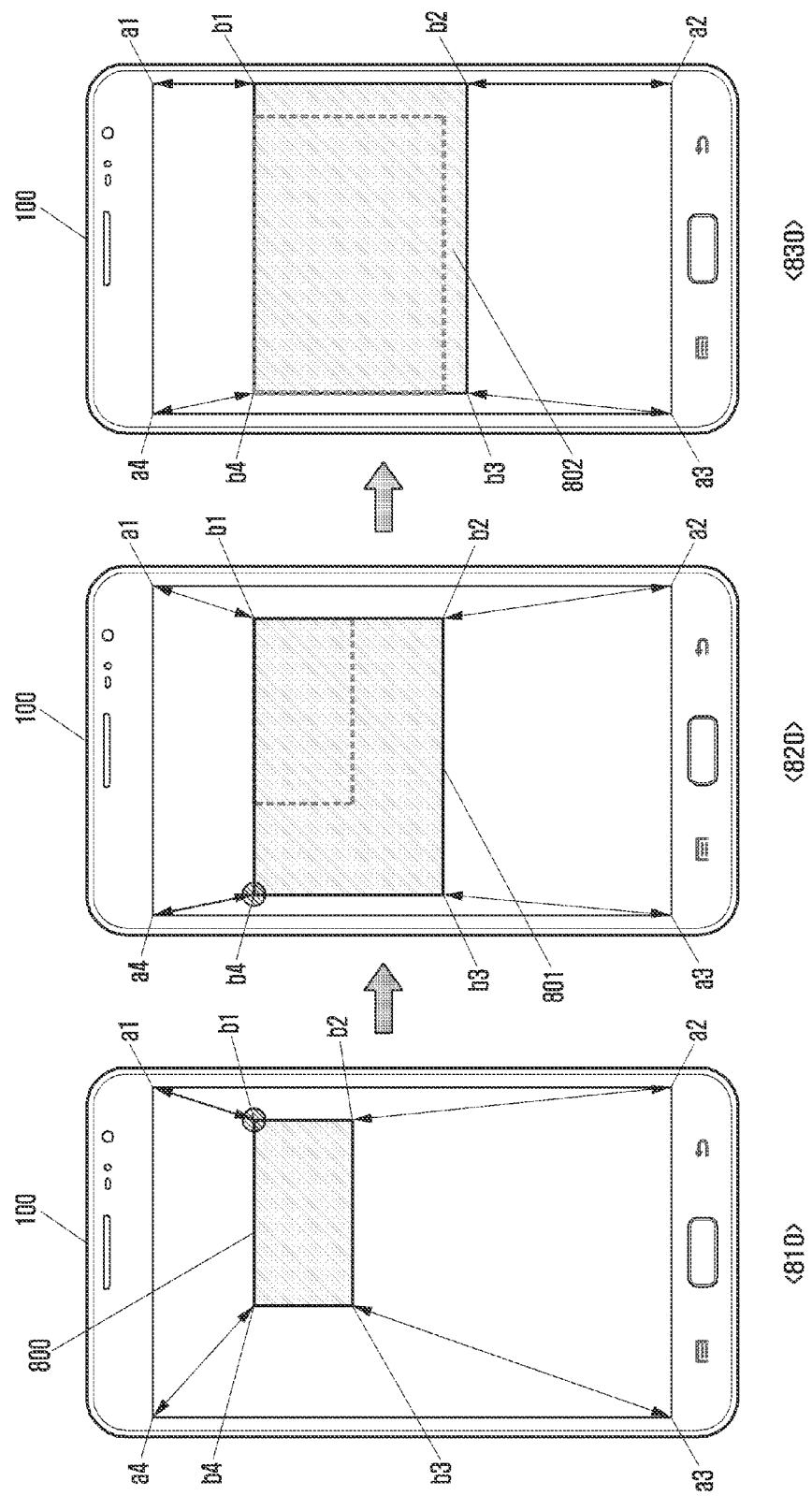

FIGS. 7 and 8 illustrate a method for increasing a size of a window on a basis of a reference point that has been configured according to the method set forth before with reference to FIG. 4 according to the embodiment of the present disclosure.

After the reference point of a window 700 is configured, when the controller 160 detects the contact of the window 700 with a pre-set area while the property of the window 700 is changed according to the reference point, the controller 160 stops changing the property of the window and reconfigures the reference point of the window 700, to thereby resume the change of the property of the window 700 according to the reconfigured reference point.

Referring to FIG. 7, in execution diagram 710, the first corner b1 is configured to be the reference point according to the method of FIG. 4.

In execution diagram 710, after the first corner b1 is configured to be the reference point of the window 700, a request for increasing the size of the window 700 is received. In response to reception of a request for increasing the size of the window 700, the controller 160 increases the size of the window 700 on the basis of the first corner b1 as shown in execution diagram 720.

The controller 160 detects the contact of one side of the window 701 with the pre-set area due to the increase in the size of the window 700. The pre-set area may be edges of the screen area 200, or a portion of the screen area 200 within a predetermined distance from the edges of the screen area 200. FIG. 7 shows that the edges of the screen area 200 is configured to be the pre-set area, but the pre-set area is not limited thereto.

When the controller 160 detects the contact of the window 701 with the pre-set area due to the change of the property thereof, the controller 160 stops increasing the size of the window 701, and reconfigures the reference point of the window 701. Then, the controller 160 continues to change the property of the window 701, based on the reconfigured reference point.

As shown in execution diagram 720, when the controller 160 detects the contact of one side of the window 701 with the edge of the screen area 200 due to the increase in the size of the window 700, the controller 160 stops increasing the size of the window 701. Further, the controller 160 reconfigures the reference point of the window 701 according to the method described in FIG. 4. In execution diagram 720, the fourth corner b4 becomes the reconfigured reference point of the window 701. The controller 160 continues to increase the size of the window 701, based on the reconfigured reference point (e.g., the fourth corner b4 as shown in execution diagram 730).

According to various embodiments of the present disclosure, because the reference point of the window is configured, and the property of the window is changed based on the reference point, the window can be maintained within the screen area.

Meanwhile, with the increase in the size of the window 701, the location coordinate property of the window 700 is changed (as denoted by window 701 of the execution diagram 720 and window 702 of the execution diagram 730). The controller 160 reconfigures the reference point of the window 700 of which location coordinate property has been changed.

At this time, the reference point of the window 700 may be reconfigured according to the predetermined reference applied in execution diagram 710. For example, the controller 160 detects the corner of the window 700, which corresponds to the shortest distance among the measured distances between the corners b1 to b4 of the window 700 and the corners a1 to a4 of the screen area 200, and configures the detected corner of the window 700 to be the reference point.

For example, in the case of the enlarged window 800 as shown in window 801 in execution diagram 820, the reference point of the window 700 may be changed to the first corner b1 of window 802 as shown in execution diagram 830.

Figure 9:
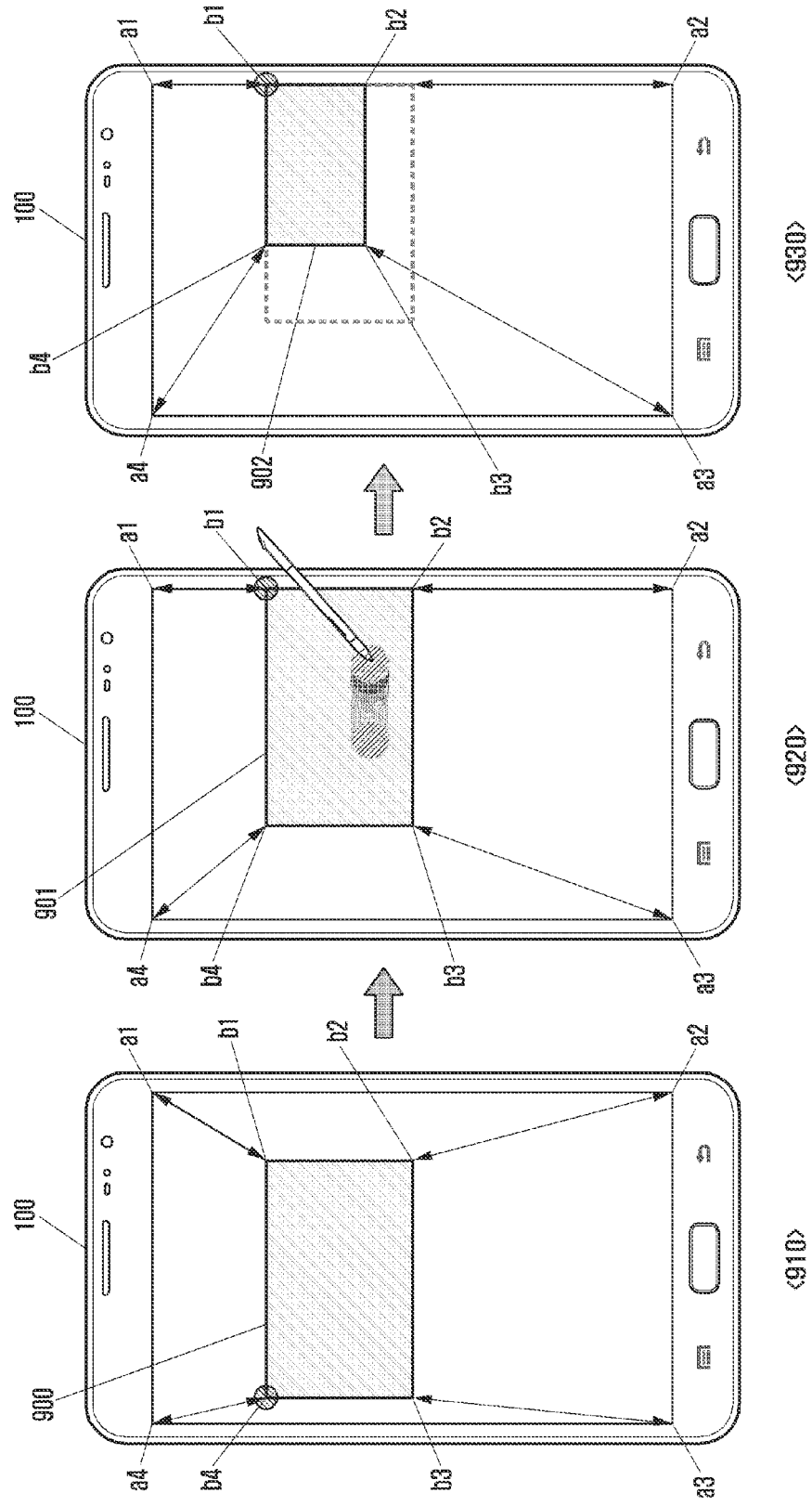

FIG. 9 illustrates an example of a method for controlling a window according to an embodiment of the present disclosure.

Referring to FIG. 9, after the reference point of a window 900 is configured, when the location of the window 900 is changed, the controller 160 detects the contact of the window 900 with the pre-set area during the movement of the window 900. When the controller 160 detects the contact of the window 900 with the pre-set area during the movement of the window 900 (e.g., in response to the controller 160 detecting the contact of the window), the controller 160 stops changing the location of the window 900. Then, the controller 160 reconfigures the reference point of the window 900, and continues to change the location of the window 900 while reducing the size of the window 900 on the basis of the reconfigured reference point.

Specifically, after the fourth corner b4 of the window 900 is configured to be the reference point of the window 900 according to the predetermined reference as shown in execution diagram 910, the window 900 is dragged from the left to the right by using a touch pen as shown in execution diagram 920. The controller 160 detects the contact of one side of the moving window 900 with the pre-set edge of the screen area 200. In response to detection of the contact of one side of the moving window 900 with the pre-set edge of the screen area 200, the controller 160 stops changing the location of the window 900. With the movement of window stopped, the controller 160 reconfigures the first corner b1 to be the reference point of the window 900 according to the predetermined reference. Afterwards, the controller 160 moves the window 900 from the left to the right while reducing the size of the window 900 on the basis of the first corner b1, as shown with the window 902 in execution diagram 930.

FIGS. 10 to 13 illustrate an example of a method for controlling a window according to an embodiment of the present disclosure.

Referring to FIGS. 10 to 13, the controller 160 divides the screen area 200 into division areas e1 to e4 at an equal ratio of area so that each of the division areas e1 to e4 includes each of corners a1 to a4 of the screen area 200, respectively. The controller 160 detects the corner of the window, which belongs to the division area in which the center point of the window is located. Then, the controller 160 configures the detected corner to be the reference point of the window. When the request for changing the property of the window (e.g., in response to the controller 160 detecting a request for changing the property of the window), the controller 160 changes the property of the pop-up window on the basis of the configured reference point. In addition, the controller 160 reconfigures the reference point of the property-changed window according to the predetermined reference.

Figure 10:
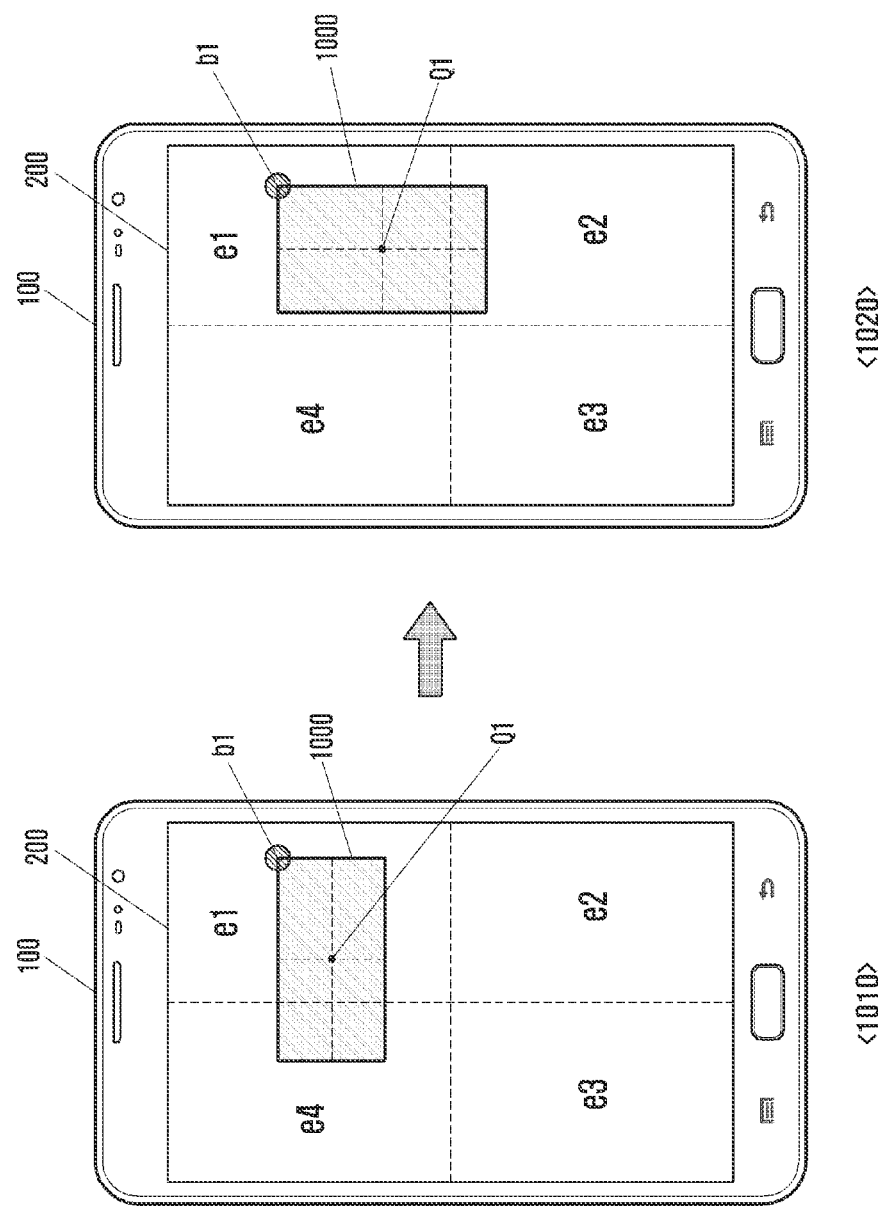

For example, referring to FIG. 10, in execution diagram 1010, the screen area 200 is divided into the first screen area e1, the second screen area e2, the third screen area e3, and the fourth screen area e4. The center point Q1 of a window 1000 is detected to be in the first screen area e1. The first corner b1 of the window 1000 is detected to belong to the first screen area e1 in which the center point Q1 is located. Accordingly, the first corner b1 is configured to be the reference point of the window 1000.

Afterwards, when the request for rotating the window 1000 at a predetermined angle is received, the window 1000 is rotated on the basis of the first corner b1 as shown in execution diagram 1020.

According to various embodiments of the present disclosure, because the reference point of the window is configured, and the property of the window is changed based on the reference point, the window can be maintained within the screen area.

Meanwhile, with the rotation of the window 1000, the location coordinate property of the window 1000 is changed. The controller 160 reconfigures the reference point of the window 1000 of which location coordinate property has been changed.

Figure 11:
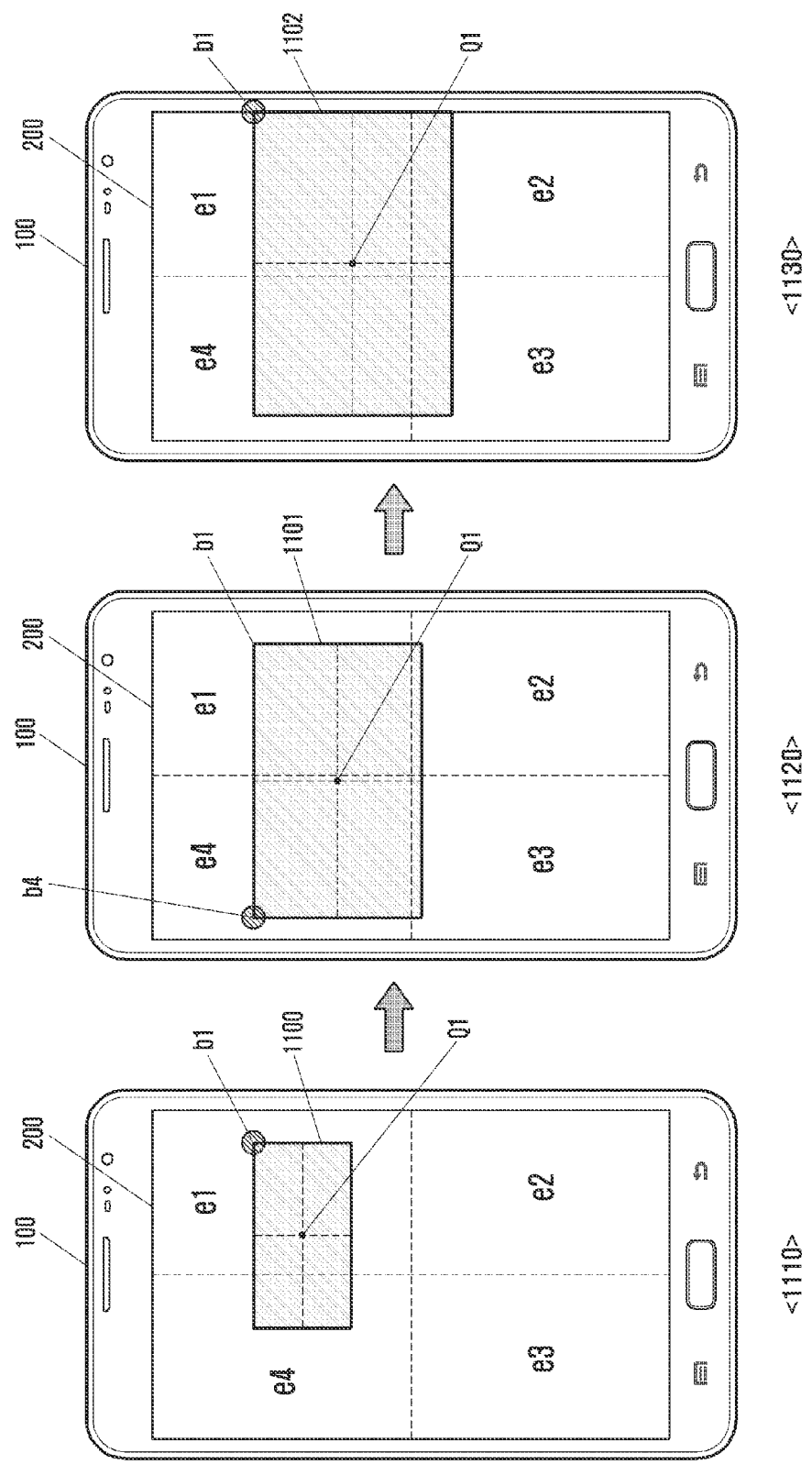

Referring to FIG. 11, after the first corner b1 is configured to be the reference point of the window 1100 in execution diagram 1110, when the request for increasing the size of the window 1100 is received (e.g., in response to the controller 160 receiving the request for increasing the size of the window 1100), the controller 160 increases the size of the window as shown in execution diagram 1120. The controller 160 detects that the center point Q1 of the enlarged window 1101 has been moved to the fourth screen area e4, and reconfigures the fourth corner b4 of the window 1101, which belongs to the fourth screen area e4, to be the reference point.

If the center point Q1 of the enlarged window 1102 returns to the first screen area e1 due to the increase in the size of the window as shown in execution diagram 1130, the controller 160 reconfigures the first corner b1 of the window 1102, which belongs to the first screen area e1, to be the reference point.

Figure 12:
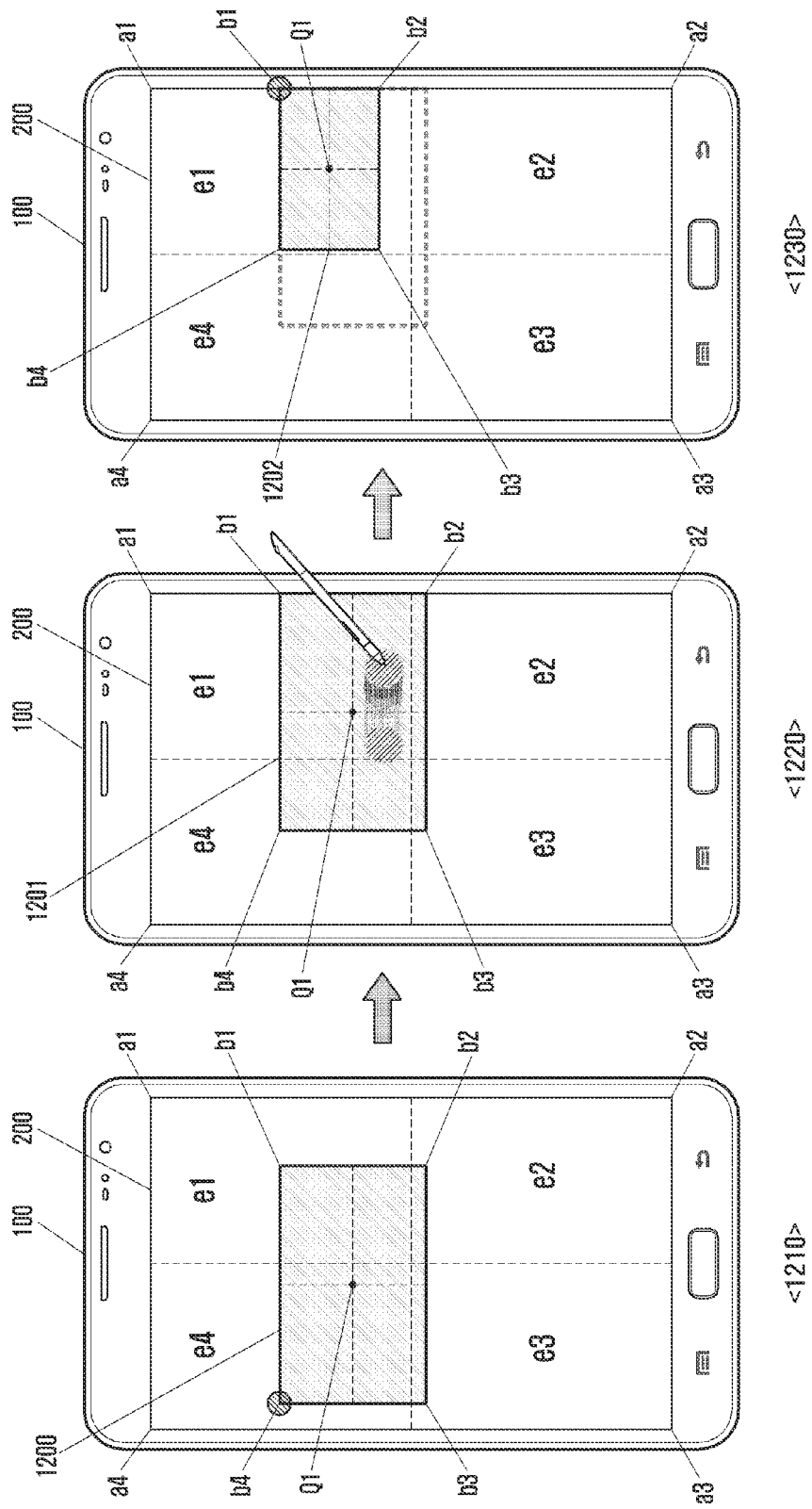

Referring to FIG. 12, after the first corner b1 is configured to be the reference point of a window 1200 in execution diagram 1210, when the request for changing the location of the window 1200 is received (e.g., in response to changing the location of the window 1200), the controller 160 changes the location of the window 1200 as shown with window 1201 in execution diagram 1220. The controller 160 detects the contact of the one side of the window 1200 with the pre-set area during the change of the location of the window 1200. Execution diagram 1220 shows that the edges of the screen area 200 are configured to be the pre-set area.

When the controller 160 detects the contact of the window 1200 with the edge of the screen area 200 during the change of the location of the window 1200 (e.g., in response to the controller 160 detecting the contact of the window with the edge of the screen area 200), the controller 160 stops changing the location of the window 1200, and reconfigures the reference point of the window 1200. Because the center point Q1 of the window 1200 is located in the first screen area e1, the controller 160 configures the first corner of the window 1200, which belongs to the first screen area e1, to be the reference point. Afterwards, the controller 160 reduces the size of the window 1200 on the basis of the reference point. For example, the first corner b1 while moving the pop-up window 1200 on the basis of the first corner b1, as shown with window 1202 in execution diagram 1230.

Figure 13:
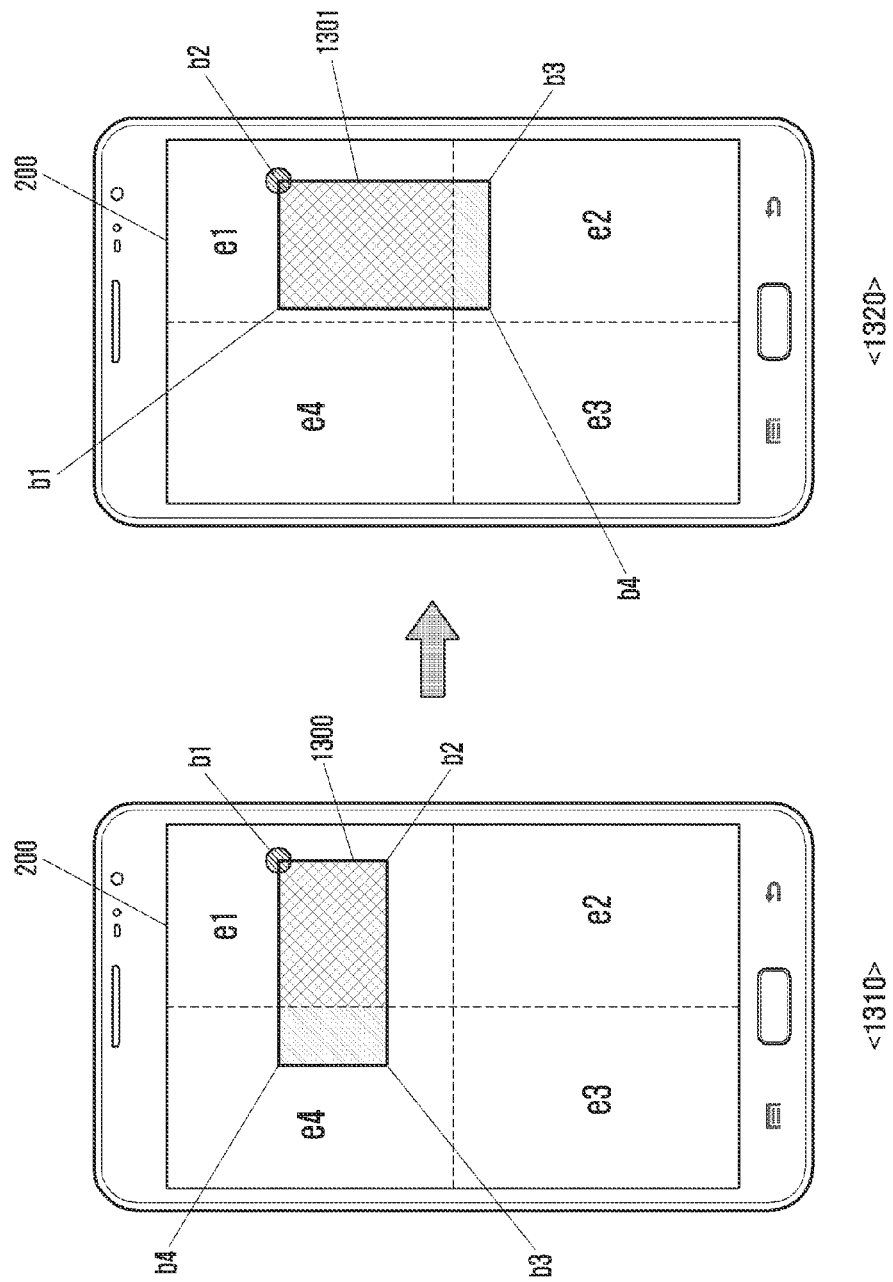

After the center point of the window is moved first as shown in FIGS. 13 and 14, the property of the window may be changed according to the moved center point.

According to various embodiments of the present disclosure, because the reference point of the window is configured, and the property of the window is changed based on the reference point, the window can be maintained within the screen area.

Referring to FIG. 13, the controller 160 divides the screen area 200 into division areas e1 to e4 at an equal ratio of area so that each of the division areas e1 to e4 respectively includes one of the corners a1 to a4 of the screen area 200.

The controller 160 calculates the ratio of area at which the window occupies each of the division areas e1 to e4, and detects the division area corresponding to the highest ratio of area. The controller 160 detects the corner of the window, which belongs to the detected division area, and configures the detected corner to be the reference point of the window. When the request for changing the property of the window is received (e.g., in response to receiving the request to change the property of the window), the controller 160 changes the property of the window on the basis of the configured reference point, and reconfigures the reference point of the window, of which property has been changed, according to the above-described method.

For example, in execution diagram 1310, the screen area 200 is divided into the first screen area e1, the second screen area e2, the third screen area e3, and the fourth screen area e4. The first screen area e1 is detected to have the highest ratio of area of the window 1300. Accordingly, the first corner b1, which belongs to the first screen area e1, is configured to be the reference point of the window 1300.

Afterwards, when the request for rotating the window 1300 at a predetermined angle is received (e.g., in response to receiving the request for rotating the window at a predetermined angle), the window 1300 is rotated on the basis of the first corner b1 as shown with window 1301 in execution diagram 1320.

In the present disclosure, because the reference point of the window is configured, and the property of the window is changed based on the reference point, the window can be maintained within the screen area.

Meanwhile, with the rotation of the window 1300, the location coordinate property of the window 1300 is changed. Accordingly, the controller 160 reconfigures the reference point of the window 1300, of which location coordinate property has been changed, according to the above-described reference, so that the second corner b2 may be reconfigured to be the reference point of the window 1300.

Referring to FIG. 14, the controller 160 divides the screen area 200 into division areas e1 to e4 at an equal ratio of area so that each of the division areas e1 to e4 respectively includes one of the corners a1 to a4 of the screen area 200. Because the center point Q1 of the window 1400 is located in the first screen area e1, the controller 160 configures the first corner of the window 1400, which belongs to the first screen area e1, to be the reference point (e.g., first corner b1). After the first corner b1 is configured to be the reference point of the window 1400 in execution diagram 1410, when the request for rotating the window 1400 at a predetermined angle is received (e.g., in response to receiving the request for rotating the window at a predetermined angle), the window 1400 is rotated on the basis of the first corner b1 as shown with window 1401 in execution diagram 1420. As illustrated in execution diagrams 1420, the center point Q1 is dynamically determined (e.g., calculated) for windows 1400 and 1401.

The method according to various embodiments of the present disclosure as described above may be implemented as a program command which can be executed through various computers and recorded in a non-transitory computer-readable recording medium. The non-transitory computer-readable recording medium may include a program command, a data file, and a data structure. The program command may be specially designed and configured for the present disclosure or may be used after being known to those skilled in computer software fields. The non-transitory computer-readable recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware devices such as a ROM, a RAM and a flash memory. Further, the program command may include a machine language code generated by a compiler and a high-level language code executable by a computer through an interpreter, and/or the like. The hardware devices may be configured to operate as one or more software modules to realize the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a window having a changeable property, the method comprising:
   displaying the window on a screen area;
   configuring a reference point of the window according to a predetermined reference;
   receiving a request for changing a property of the window;
   in response to the receiving of the request for changing the property of the window, changing the property of the window on a basis of the reference point; and
   displaying a window corresponding to the changed property,
   wherein the reference point is configured based on respective distances between at least one of specific coordinates of the window and at least one corner of the screen area such that the window corresponding to the changed property is fully displayed on the screen area.

2. The method of claim 1, further comprising: reconfiguring the reference point of the property-changed window in response to the changing of the property of the window.

3. The method of claim 1, wherein the configuring of the reference point of the window comprises:
   measuring respective distances between corners of the window and corners of the screen area;
   detecting a corner of the window, which corresponds to a predetermined distance; and
   configuring the detected corner of the window to be the reference point.

4. The method of claim 1, wherein the configuring of the reference point of the window comprises:
   measuring respective distances between centers of sides of the window and corners of the screen area;
   detecting a corner of the window, which is adjacent to the corner of the screen area, which corresponds to a predetermined distance; and
   configuring the detected corner of the window to be the reference point.

5. The method of claim 1, wherein the configuring of the reference point of the window comprises:
   measuring respective distances between a center point of the window and corners of the screen area;
   detecting a corner of the window, which is adjacent to the corner of the screen area, which corresponds to a predetermined distance; and
   configuring the detected corner of the window to be the reference point.

6. The method of claim 1, wherein the configuring of the reference point of the window comprises:
   dividing the screen area into division areas at a predetermined ratio so that each of the division areas respectively includes each corner of the screen area;
   detecting a corner of the window, which belongs to the division area in which a center point of the window is located; and
   configuring the detected corner of the window to be the reference point.

7. The method of claim 1, wherein the configuring of the reference point of the window comprises:
   dividing the screen area into division areas at a predetermined ratio so that each of the division areas respectively includes each corner of the screen area;
   calculating a ratio at which the window occupies each of the division areas;
   detecting a division area that corresponds to a predetermined ratio;
   detecting a corner of the window, which belongs to the detected division area; and
   configuring the detected corner of the window to be the reference point.

8. The method of claim 1, wherein the changing of the property of the window comprises:
   detecting a contact of the window with a pre-set area during the change of the property of the window;
   stopping the changing of the property of the window;
   reconfiguring the reference point of the window; and
   resuming the changing the property of the window on a basis of the reconfigured reference point.

9. The method of claim 1, wherein the changing of the property of the window comprises:
   detecting a contact of one side of the window with a pre-set area during a change of a location of the window;
   stopping the changing of the location of the window;
   reconfiguring the reference point of the window; and
   reducing a size of the window while changing the location of the window on a basis of the reconfigured reference point.

10. The method of claim 1, wherein the reconfiguring of the reference point of the property-changed window comprises, reconfiguring the reference point of the property-changed window according to the predetermined reference.

11. The method of claim 1, wherein the receiving of the request for changing the property of the window comprises:
    receiving a request for changing at least one of a location, a size, a shape, a movement direction, and a rotation of the window.

12. An electronic device for supporting a window control, the electronic device comprising:
    a display unit configured to display a window; and
    a controller configured to:
       configure a reference point of the window according to a predetermined reference,
       receive a request for changing a property of the window, and
       change the property of the window on a basis of the reference point in response to the receiving of the request for the changing of the property of the window,
    wherein the reference point is configured based on respective distances between at least one of specific coordinates of the window and at least one corner of the display unit such that the window corresponding to the changed property is fully displayed on the display unit.

13. The electronic device of claim 12, wherein the controller is further configured to reconfigure the reference point of the property-changed window in response to the changing of the property of the window.

14. The electronic device of claim 12, wherein the controller is further configured to:
    measure respective distances between corners of the window and corners of the display unit,
    detect a corner of the window, which corresponds to a predetermined distance, and
    configure the detected corner of the window to be the reference point.

15. The electronic device of claim 12, wherein the controller is further configured to:
    measure respective distances between centers of sides of the window and corners of the display unit,
    detect a corner of the window, which corresponds to a predetermined distance, and configure the detected corner of the window to be the reference point.

16. The electronic device of claim 12, wherein the controller is further configured to:
   measure respective distances between a center point of the window and corners of the display unit,
   detect a corner of the window, which corresponds to a predetermined distance, and
   configure the detected corner of the window to be the reference point.

17. The electronic device of claim 12, wherein the controller is further configured to:
   divide the display unit into division areas at a predetermined ratio so that each of the division areas respectively includes each corner of the display unit,
   detect a division area where a center point of the window is located,
   detect a corner of the window, which belongs to the detected division area, and
   configure the detected corner of the window to be the reference point.

18. The electronic device of claim 12, wherein the controller is further configured to:
   divide the display unit into division areas at a predetermined ratio so that each of the division areas respectively includes each corner of the display unit,
   calculate a ratio at which the window occupies each of the division areas,
   detect a division area that corresponds to a predetermined ratio,
   detect a corner of the window, which belongs to the detected division area, and
   configure the detected corner of the window to be the reference point.

19. The electronic device of claim 12, wherein, the controller is further configured to:
   detect a contact of the window with a pre-set area during the change of the property of the window,
   in response to the detecting of the contact of the window with the pre-set area during the changing of the property of the window:
      stop the changing of the property of the window,
      reconfigure the reference point of the window, and
      resume the changing the property of the window on a basis of the reconfigured reference point.

20. The electronic device of claim 12, wherein, the controller is further configured to:
   detect a contact of one side of the window with a pre-set area during a change of a location of the window, and
   in response to the detecting of the contact of the one side of the window with the pre-set area during the changing of the location of the window:
      stop the changing of the location of the window,
      reconfigure the reference point of the window, and
      reduce a size of the window while changing the location of the window on a basis of the reconfigured reference point.

* * * * *